United States Patent [19]
Ozue et al.

[11] Patent Number: 6,038,200
[45] Date of Patent: *Mar. 14, 2000

[54] AUTOCHANGER

[75] Inventors: Tadashi Ozue; Takao Hiramoto, both of Kanagawa, Japan

[73] Assignee: Sony Corporation, Japan

[*] Notice: This patent is subject to a terminal disclaimer.

[21] Appl. No.: 09/041,028

[22] Filed: Mar. 12, 1998

Related U.S. Application Data

[63] Continuation of application No. 08/637,716, Jun. 27, 1996.
[51] Int. Cl.[7] .................................................. G11B 17/22
[52] U.S. Cl. .............................. 369/34; 360/71; 360/92
[58] Field of Search .................................. 369/34, 32, 30, 369/36, 37, 38, 39, 178; 300/71, 92, 132

[56] References Cited

U.S. PATENT DOCUMENTS

| | | | |
|---|---|---|---|
| 5,303,214 | 4/1994 | Kulakowski et al. | 369/34 |
| 5,598,385 | 1/1997 | Mizukami et al. | 369/34 |
| 5,634,032 | 5/1997 | Haddock | 369/34 |
| 5,793,714 | 6/1998 | Inoue et al. | 369/30 |
| 5,802,020 | 9/1998 | Kaneko et al. | 369/34 |

*Primary Examiner*—Tan Dinh
*Attorney, Agent, or Firm*—Rader, Fishman & Grauer; Ronald P. Kananen

[57] ABSTRACT

An autochanger incorporates a storage unit that includes a plurality of storage sections for storing recording medium cartridges. The recording medium cartridges have a recording medium installed, and a first memory for storing data informative of the recording medium. Connection terminals allocated to the storage sections are provided for accessing the first memory of a desired recording medium cartridge. A loading/unloading unit is provided for loading and unloading the cartridges, and accessing a data signal on the recording medium of the cartridges. A carrier conveys the recording medium cartridges between the storage unit and the loading/unloading unit, and a control memory saves the informative data. A system controller controls the storage of the cartridges by reading the informative data from the first memory on the cartridges, saving the informative data to the control memory, and updating the informative data in both the first and control memories according to a response of the loading/unloading unit to accessing data on the recording mediums.

8 Claims, 8 Drawing Sheets

AUTOCHANGER

This application is a continuation of application Ser. No: 08/637,716 filed Jun. 27, 1996.

TECHNICAL FIELD

The present invention relates to an autochanger, and more specifically to an autochanger for unloading recording mediums of a cartridge type from their respective storage cells of a storage array, and after recording or playing back information (data) on the recording mediums, loading them back to their storage cells.

Autochangers are known for unloading desired cartridge type recording mediums from their storage cells and transferring them to a record/playback apparatus (referred to as a drive hereinafter) where data stored in the cartridge type recording mediums may be picked up for playback. The disadvantage of such known autochangers is that the data stored in any desired cartridge type recording medium can rarely be identified by e.g. viewing the cartridge and have to be played for examining whether the cartridge type recording medium loaded in a drive is a desired one or not.

For improvement, a conventional autochanger has been developed in which each cartridge type recording medium is accompanied with a label on which a barcode representing informative data of the cartridge type recording medium is printed and can thus be identified by reading its label.

Another conventional autochanger is also proposed in which informative data indicating the recording medium contents has been written on the cartridge type recording medium and is read for identifying the contents of the cartridge type recording medium. More particularly, the informative data representing the contents of the cartridge type recording medium may be recorded on the leading end of a magnetic tape loaded as a recording medium in the cartridge, or printed in the form of an optical reflector seal or an optical code pattern on the same. The cartridge type recording medium can thus be identified by scanning and reading the magnetic, optical seal, or pattern form of informative data.

There are still disadvantages in that the barcode on the label can retain a small amount of information, and needs to be written with a barcode writer such as an ink-jet barcode printer and to be read with a barcode reader such as a laser barcode scanner. This will cause the conventional autochanger to extend its duration of handling and increase its overall cost.

It is also difficult to read the informative data recorded directly on the cartridge type recording medium particularly when the recording medium e.g. a magnetic tape, is placed in its storage cell. When the cartridge type recording medium has been transferred to the drive, the informative data cannot be read or written without loading the magnetic tape directly on the drive.

For example, a magnetic tape cartridge carrying its informative data written with an autochanger has to be loaded to the drive for playing back and for identifying its data content before it is transferred from one cell to another. As the magnetic tape cartridges increase in number, the time and labor for handling will be it is.

If magnetic tape cartridges have dropped from their cells due to e.g. an earthquake, they are identified only by reading informative data on their tapes before being returned back to their cells. This is not a simple task.

A recording medium storage device is disclosed in Japanese Patent Laid-open Publication 64-1189 (1989), attempting to overcome the above problem. The storage device is designed for storing cartridge type recording mediums on a group of cells and includes IC memories for saving data of volume labels or the like which are attached to outer shells of the cartridge type recording mediums respectively, a plurality of electrically connecting means, each mounted to the storage cell for connection to the IC memory, and a controlling means for examining the presence of a cartridge type recording medium in its cell and reading the volume label saved in its IC memory.

According to the features of the medium storage device, the volume label saved in the IC memory comprises an informative data of a video signal stored in a recording medium or video tape. This allows a desired video tape cartridge to be easily identified while seating in its cell by reading its volume label.

It is a good idea to apply the medium storage to a conventional autochanger which consecutively selects and plays back cartridge type recording mediums of e.g. TV commercial advertising programs upon request. The conventional autochanger may monitor a storage map of the cartridge type recording mediums and perform a security control, using the IC memories.

The recording mediums including a video tape carrying video signals and a magnetic tape carrying various data are susceptible to deterioration in quality at each time of playback. As the recording mediums are in long-term service, their signals from recorded data are diminished and the quality of resultant playback images will be degraded. The degree of degradation of an individual recording medium depends much on its frequency of service and will hardly be recognized by functions of the conventional autochanger as well as the medium storage. In other words, the degree of degradation on the recording medium can be determined only when it is loaded and played back in a player. This playback action for examining the degree of degradation will accelerate the degradation of the degrading recording medium.

It is an object of the present invention, in view of the foregoing predicaments, to provide an autochanger capable of conducting loading and unloading of cartridge type recording mediums stored on their respective cells and monitoring the degree of degradation on each recording medium in a cartridge.

DISCLOSURE OF THE INVENTION

An autochanger according to the present invention incorporates a storing means including a plurality of storage sections for storing cartridge type recording mediums, each cartridge type recording medium having a recording medium installed in a cartridge and a first memory carrying informative data of the recording medium mounted to the cartridge, and a corresponding number of first accessing means allocated to the storage sections respectively for accessing the first memory of a desired cartridge type recording medium. The autochanger also includes a second accessing means for loading and unloading the desired cartridge type recording medium thereon and accessing a data signal on the recording medium of the cartridge type recording medium, a conveying means for conveying the cartridge type recording medium between the storing means and the second accessing means, a second memory for saving the informative data, and a controlling means for controlling the storage of the cartridge type recording medium being stored in a storage section of the storing means, reading through the first accessing means the informative data from the first memory on the cartridge type recording medium and saving it in the second memory, and updating the informative data in both the first and second memories according to a response of the second accessing means to access the data signal on the recording medium of the cartridge type recording medium.

Both the first and second memories save as the informative data a history of access actions of the second accessing means to the data signal on the recording medium of each cartridge type recording medium, and the controlling means is responsive to the history of access action for controlling the actions of the second accessing means and conveying means.

The second accessing means includes a third accessing means for accessing the informative data in the first memory of the cartridge type recording medium which is loaded in the second accessing means.

The second accessing means may include an access error detecting means for detecting an access error during accessing the data signal on the recording medium of the cartridge type recording medium which is loaded in the second accessing means.

The controlling means is responsive to the accessing error detected by the access error detecting means for updating the informative data saved in both the first and second memories.

The access error detecting means detects an access error from a result of playing back the data signal on the recording medium of the cartridge type recording medium to which access is demanded.

Both the first and second memories may save as the informative data a history of access errors detected by the access error detecting means, and the access error detecting means detects an access error on the basis of the history of access errors.

Also, the access error detecting means may detect an access error by referring to the number of retry access actions to the data signal on the recording medium of the cartridge type recording medium with consideration of a result of playing back the data signal on the recording medium of the cartridge type recording medium to which access is demanded.

The access error detecting means may determine the occurrence of an access error if the access action to a data signal is repeated more than a predetermined number of times, and when the access action is repeated a second number of times which is smaller than the first predetermined number, may generate a second retry signal indicative of the access actions repeating the second number of times and saves it as the informative data in the first and second memories.

Furthermore, the access error detecting means may determine the occurrence of an access error when the access action to a data signal is repeated less than the first predetermined number of times, but the access action is repeated the second number of times smaller than the first number and the second retry signal is greater than a predetermined value.

The controlling means may judge from the result of detection of the access error detecting means whether or not the cartridge type recording medium is eligible for use and when it is judged not eligible, may direct the conveying means to remove the cartridge type recording medium from the autochanger and erase at least a corresponding part of the informative data of the cartridge type recording medium saved in the second memory.

The second memory may save as a part of the informative data an identity data attributed to each storage section, and the controlling means erases the identity data when it is judged from the result of detection of the access error detecting means that the cartridge type recording medium is not eligible for use.

The controlling means may judge from the result of detection of the access error detecting means whether or not the cartridge type recording medium is eligible for use and when it is judged not eligible, may direct the conveying means to convey and store the cartridge type recording medium in a storage section of the storing means prepared for storage of an unusable cartridge type recording medium.

The informative data may include an identity data attributed to each storage section of the storing means.

Also, the informative data may include a number of retry access actions of the second accessing means to the data signal.

BEST MODE FOR CARRYING OUT THE INVENTION

One embodiment of an autochanger according to the present invention will be described referring to the accompanying drawings.

Figure 1:
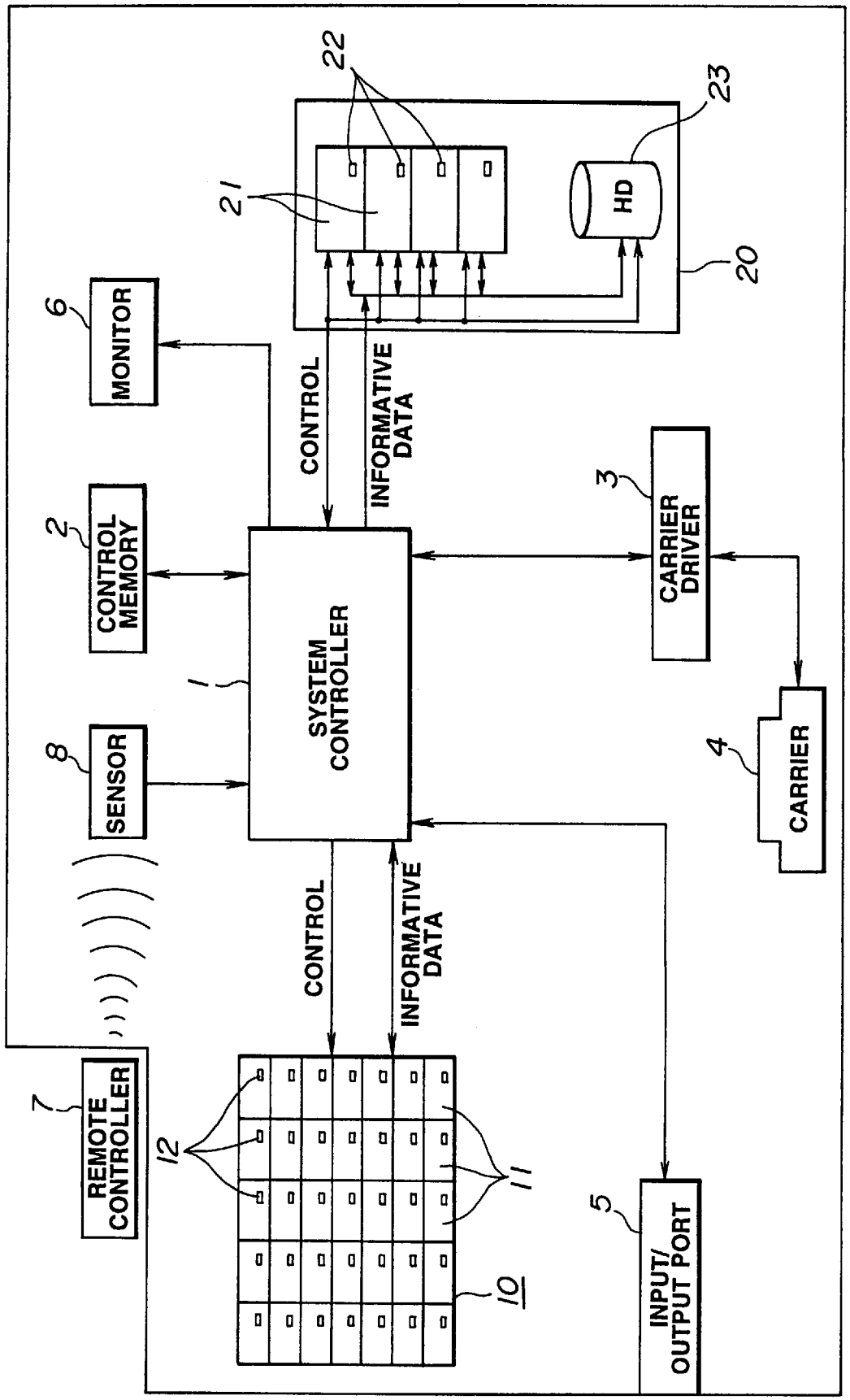
FIG. 1 is a block diagram of an embodiment of an autochanger according to the present invention.

The autochanger of the present invention comprises, as shown in FIG. 1, a cartridge storage 10 for storing a number of cartridge type recording mediums in storage cells 11 and accessing through a connection terminal 12 allocated to each storage cell 11 an IC memory 51 which holds a volume label or informative data of the cartridge type recording medium and is attached to an outer shell of the same as will be described later, a record/playback unit 20 for loading and unloading the cartridge type recording mediums and accessing a recording medium in the loaded cartridge type recording medium to obtain a data signal, a carrier 4 for conveying the cartridge type recording mediums between the cartridge storage 10 and the record/playback unit 20, a control memory 2 for saving the informative data, and a system controller 1 for controlling storage of a cartridge type recording medium being stored in its storage cell 11 in the cartridge storage 10, and for reading the informative data from its IC memory 51 through the connection terminal 12, saving it in the control memory 2, and updating the volume label saved in both the IC memory 51 and the control memory 2 according to the data signal obtained through accessing of the record/playback unit 20 to the recording medium in the cartridge type recording medium.

In operation of the autochanger, a desired cartridge type recording medium stored in the cell 11 of the cartridge storage 10 is unloaded from the cell 11 by the carrier 4 activated with the system controller 1 and conveyed to the record/playback unit 20 where a data signal is recorded or played back from its recording medium by means of a drive.

Then, the cartridge type recording medium is returned back by the carrier 4 to its cell 11. Also, when the cartridge type recording medium is stored in its cell 11, the autochanger instructs the system controller 1 to access through the connection terminal 12 the informative data including a history of service saved in the IC memory 51 of the cartridge type recording medium to examine whether or not the cartridge type recording medium is eligible for use. If the cartridge type recording medium is judged not eligible, it is discharged from the autochanger.

Figure 2:
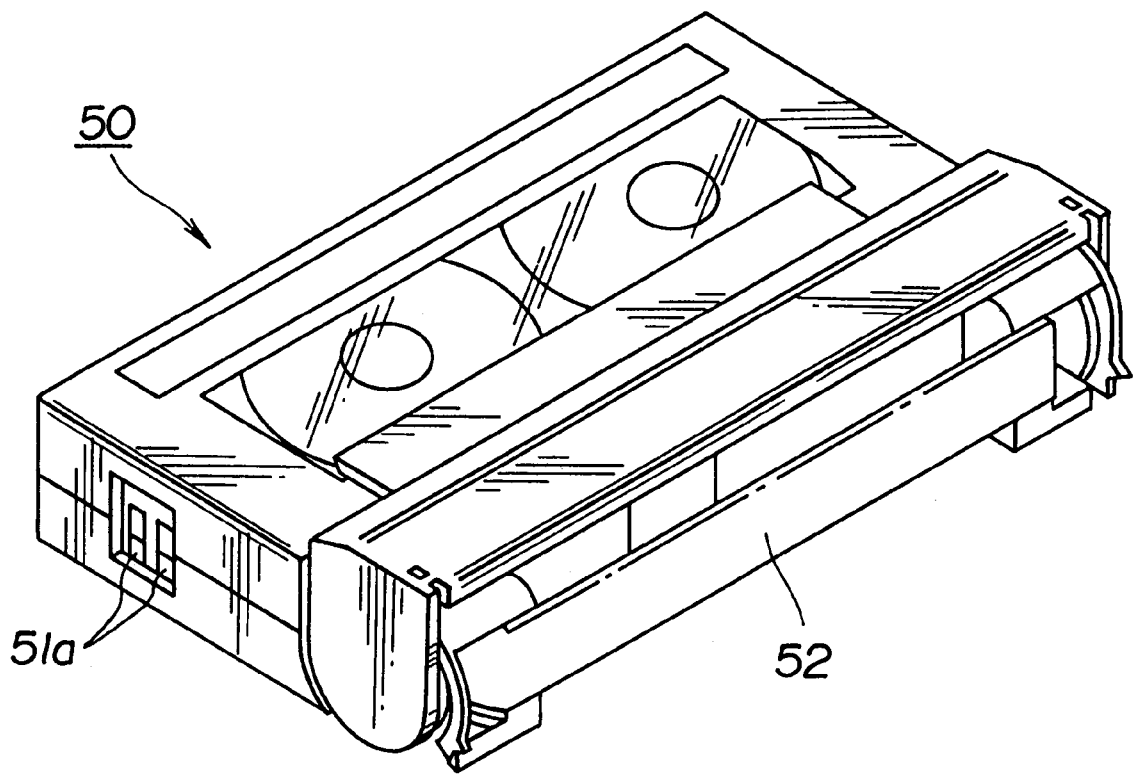
FIG. 2 is a schematic perspective view of a magnetic tape cartridge used in the autochanger.

More specifically, the cartridge type recording medium may be a magnetic tape cartridge 50 carrying a magnetic tape 52 therein, as shown in FIG. 2. Mounted on the magnetic tape cartridge 50 are the IC memory 51 which retains an informative data of the magnetic tape 52 and a connection terminal 51a disposed next to the IC memory 51 for accessing the IC memory 51. The IC memory holds the informative data which comprises, for example, ID for identifying the magnetic tape cartridge 50, a cell number indicating the storage cell 11, and an variable N. The cartridge type recording medium is not limited to the magnetic tape cartridge but may be a disk recording medium of a magnetic, optical, or optomagnetic recording mode in a cartridge or case.

The cartridge storage 10 comprises a multiplicity of the storage cells 11 for storing the magnetic tape cartridges 50 respectively which are loaded and unloaded as desired, as shown in FIG. 1. The connection terminal 12 of each storage cell 11 is connected to the connection terminal 51a of the IC memory 51 on the magnetic tape cartridge 50, allowing the cartridge storage 10 to communicate by e.g. RS-232 interface with the system controller 1.

Referring to FIG. 1, the system controller 1 is connected with a carrier driver 3 for driving the carrier 4, an input/output port 5 for storing new magnetic tape cartridges 50 in the cartridge storage 10 and discharging unwanted magnetic tape cartridges 50 from the autochanger, a monitor 6 for displaying the history of service described later, and a sensor 8 for receiving a command signal from a remote controller 7 and transmitting it to the system controller 1, of which all actions are controlled by the system controller 1. The system controller 1 may be linked by SCSI interface to the record/playback unit 20, the carrier driver 3, and the input/output port 5.

The record/playback unit 20 comprises drives 21 for accessing the data signals on the magnetic tapes 52 of the magnetic tape cartridges 50 and a magnetic disk device 23 for backup function, as shown in FIG. 1. The drive 21 has a connection terminal 22 thereof for connecting to the connection terminal 51a of the IC memory 51 on the magnetic tape cartridge 50 loaded to it.

The action of picking up a desired magnetic tape cartridge 50 from the cartridge storage 10 and recording or playing back a data signal on its magnetic tape 52. will now be explained.

The action starts with the system controller 1 accessing through the connection terminal 12 the informative data saved in the IC memory 51 of the desired magnetic tape cartridge 50 in the storage cell 11, recording it to the control memory 2, and examining the location of the cell 11 storing the magnetic tape cartridge 50 and the presence of the IC memory 51 on the desired magnetic tape cartridge 50. The control memory 2 contains a table, shown as Table 1, of the IDs identifying the magnetic tape cartridges 50 in their respective cells 11, the cell numbers indicating the storage cells 11 where the magnetic tape cartridges 50 labeled with their respective IDs are stored, yes/no options representing the presence or absence of the IC memory 51 on the ID labeled magnetic tape cartridge 50, OK/NG options indicating the effectiveness and non effectiveness of the IC memory 51 of the ID labeled magnetic tape cartridge 50, and the variables N.

TABLE 1

| ID | CELL NUMBER | IC MEMORY YES/NO | IC MEMORY OK/NG | VARIABLES N |
|----|-------------|------------------|-----------------|-------------|
| 01 | 03 | 1 | 1 | 4 |
| 02 | 01 | 0 | 0 | 1 |
| • | • | • | • | • |
| 08 | 00 | 1 | 1 | 15 |
| 09 | 05 | 1 | 0 | • |
| • | • | • | • | • |

While 00 of the cell number represents the absence of the magnetic tape cartridge 50 in a target storage cell 11, the others indicate their corresponding numbered cells 11. The binary 1 of the IC memory yes/no options indicates the presence of the IC memory 51 on the magnetic tape cartridge 50 and 0 indicates the absence. The IC memory OK/NG options are 1 when the IC memory 51 is normally activated and 0 when it has a fault.

The system controller 1 receives and examines the signal given through the sensor 7 from the user with reference to the informative data saved in the control memory 2 thus to identify the location of the desired magnetic tape cartridge 50 in the cell 1. It then instructs the carrier driver 3 to actuate the carrier 4 for unloading the desired magnetic tape cartridge 50 from the cartridge storage 10 and conveying the same to the drive 21 of the record/playback unit 20. In response to a control signal of the system controller 11, the drive 21 operates a recording or playback action on the magnetic tape 52 of the magnetic tape cartridge 50 loaded therein.

Figure 3:
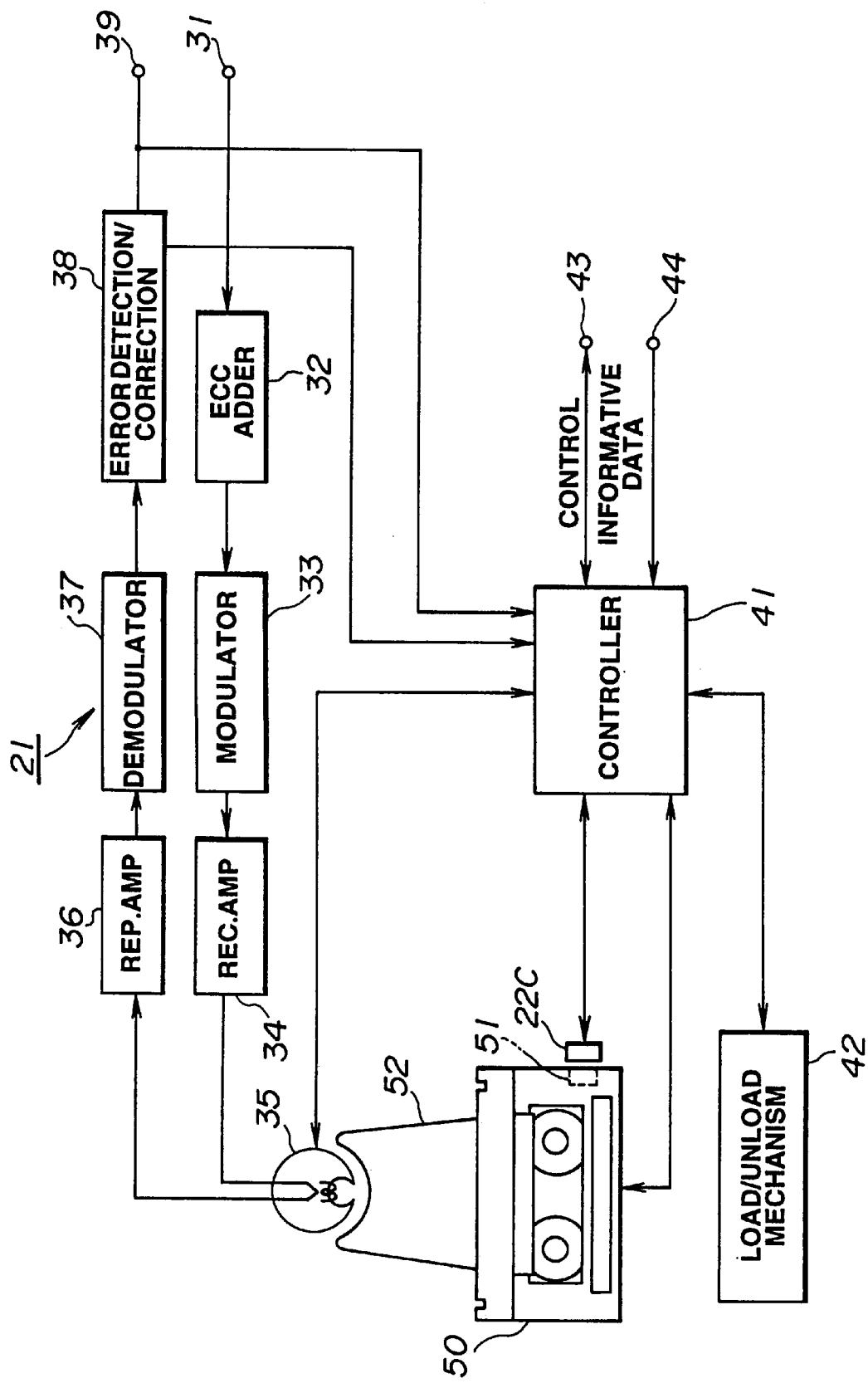
FIG. 3 is a block diagram showing the arrangement of a drive in the autochanger.

The drive 21 comprises, as shown in FIG. 3, an ECC adder circuit 32 for adding an error correction code to data supplied from a computer, a modulator circuit 33 for modulating a data output of the ECC adder circuit 32, a record amplifier 34 for amplifying a record signal of the modulator circuit 33, a magnetic head 35 for recording an amplified record signal of the record amplifier 34 onto the magnetic tape 52, a playback amplifier 36 for amplifying a playback signal reproduced by the magnetic head 35 from the magnetic tape 52, a demodulator circuit 37 for demodulating the playback signal to a playback data, an error detector/corrector circuit 38 for subjecting the playback data of the demodulator circuit 37 to error detection and correction and transmitting it to the computer, a controller 41 for controlling each circuit, and a load/unload mechanism 42 for loading and unloading the magnetic tape 52.

When the desired magnetic tape cartridge 50 has been conveyed to the drive 21, the system controller 1 delivers a control signal through a terminal 43 to the controller 41 which in turn activates the load/unload mechanism 42 for loading the magnetic tape 52. Simultaneously, the controller 41 activates a magnetic tape driver and a rotary head driver of the magnetic head 35.

The ECC adder circuit 32 adds an error correction code to the data (of a data signal) supplied through a terminal 31 from the computer. A resultant signal with the error correction code added to the data is then modulated to a record signal in the modulator circuit 33 by a manner appropriate for recording on the magnetic tape. The record signal is transmitted to the record amplifier 34.

The record amplifier 34 amplifies the record signal from the modulator circuit 33 and transmits it for driving the magnetic head 35. As the result, the data of the data signal from the computer is recoded on the magnetic tape 52.

For playing back, the data on the magnetic tape 52 is scanned by the magnetic head 35, amplified, and demodulated by the demodulator circuit 37 to a playback signal. The playback signal is then transmitted to the error detection/correction circuit 38.

The error detection/correction circuit 38 performs an error detecting and correcting action on the playback signal from the demodulator circuit 37 to reproduce the original data which is transferred through the terminal 39 and the controller 41 to the computer. Also, if the error correction fails to be done, its message is imparted to the controller 41. The reproduction of the data (of the data signal) recorded on the magnetic tape is now completed.

The controller 41 upon completion of the recording or playing back the data signal on the magnetic tape 52 of the desired magnetic tape cartridge 50 drives the load/unload mechanism 42 to unload the magnetic tape 52 and transmits through the terminal 43 to the system controller 1 a control signal indicative of completion of the recording or playing back.

In response to the control signal, the system controller 1 activates the carrier driver 4 for causing the carrier 4 to take out the magnetic tape cartridge 50 from the drive 21 and store it in, for example, its initial storage cell 11 of the cartridge storage 10.

Accordingly, the autochanger of the embodiment performs automatically a process of recording or playing back a data signal on the magnetic tape 52 of a desired magnetic tape cartridge 50 as well as a process of reading an informative data from the IC memory 51 on the magnetic tape cartridge 50 and systematically utilizing it to sort and store a new magnetic tape cartridge 50 or a magnetic tape cartridge labeled by another autochanger in the cartridge storage 10 and to discard the existing magnetic tape cartridges 50 of which magnetic tapes 52 are significantly degraded.

The procedure of storing a new magnetic tape cartridge 50 in the cartridge storage 10 will be described referring to the flow charts of FIGS. 4A and 4B. Like alphabetic letters (a, b, and c) represent linkage between the FIGS. 4A and 4B.

Figure 4A:
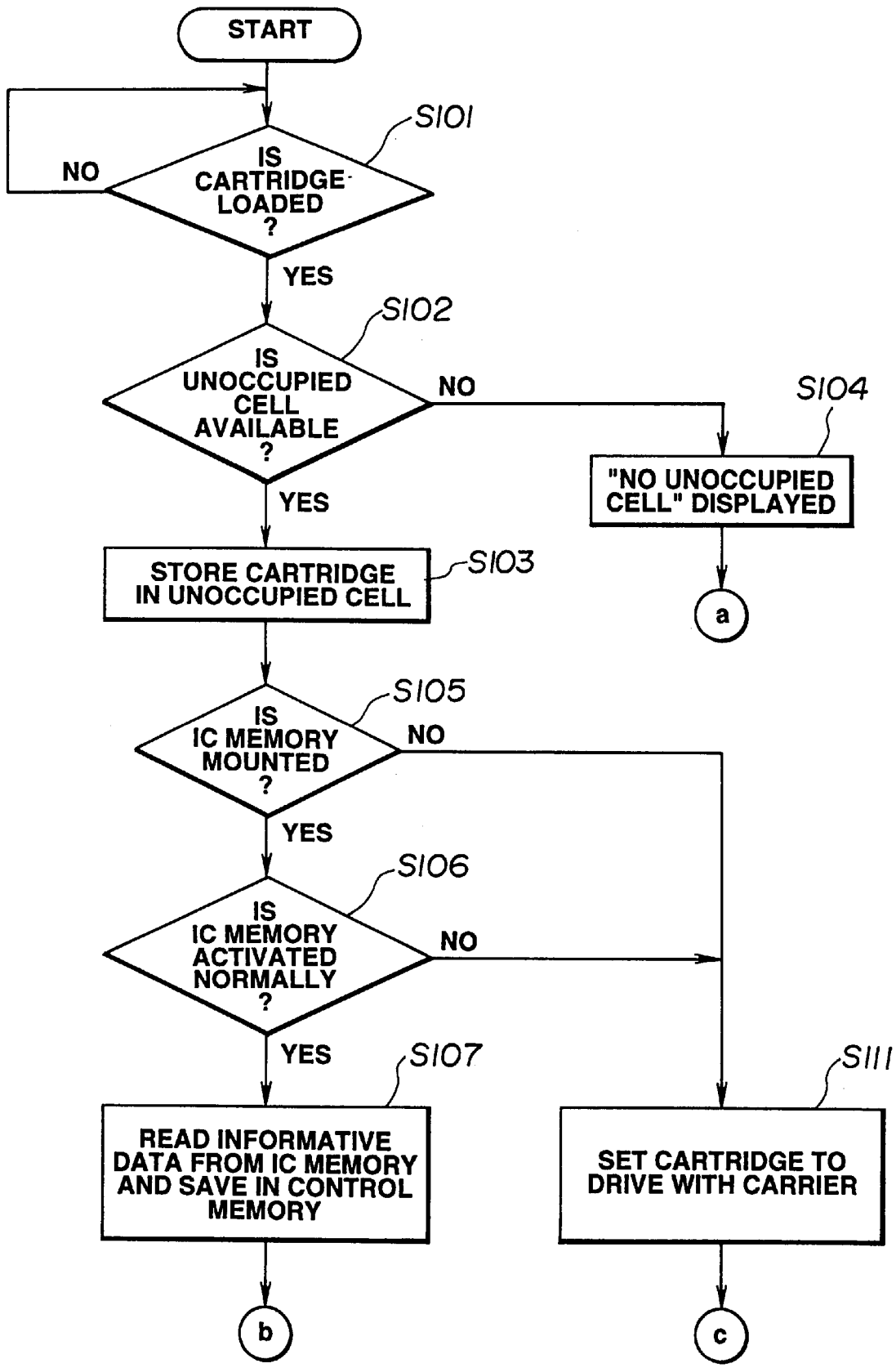
FIGS. 4A and 4B are flow charts explaining steps of operation of the autochanger.

Referring to FIG. 4A, Step S101 starts in which the system controller 1 examines whether or not a new magnetic tape cartridge 50 is loaded to the input/output port 5. If it is judged yes, the procedure goes to Step S102 and if not, Step S101 is repeated.

At Step S102, the system controller 1 judges from the informative data saved in the control memory 2 whether or not an unoccupied cell is available in the cartridge storage 10. When the unoccupied cell is found, the procedure moves to Step S103 and if not, to Step S104. In fact, the cell numbers allocated to the storage cells 11 are examined if there are numbers not included in the informative data and thus representing potentially unoccupied cells.

Step S103 allows the system controller 1 to activate the carrier driver 3 for causing the carrier 4 to convey the magnetic tape cartridge 50 from the input/output port 5 to the unoccupied cell 11.

The system controller 1 then accesses at Step S104 through the connection terminal 12 the IC memory 51 of the newly stored magnetic tape cartridge 50 to examine the presence of the IC memory 51. When the IC memory 51 is present, the procedure goes to Step S106 and if not, to Step S111.

At Step S106, the IC memory 51 is checked by the system controller 1 for normal operation. When the IC memory 51 is normal, the procedure advances to Step S107 and if not, to Step S111.

Figure 4B:
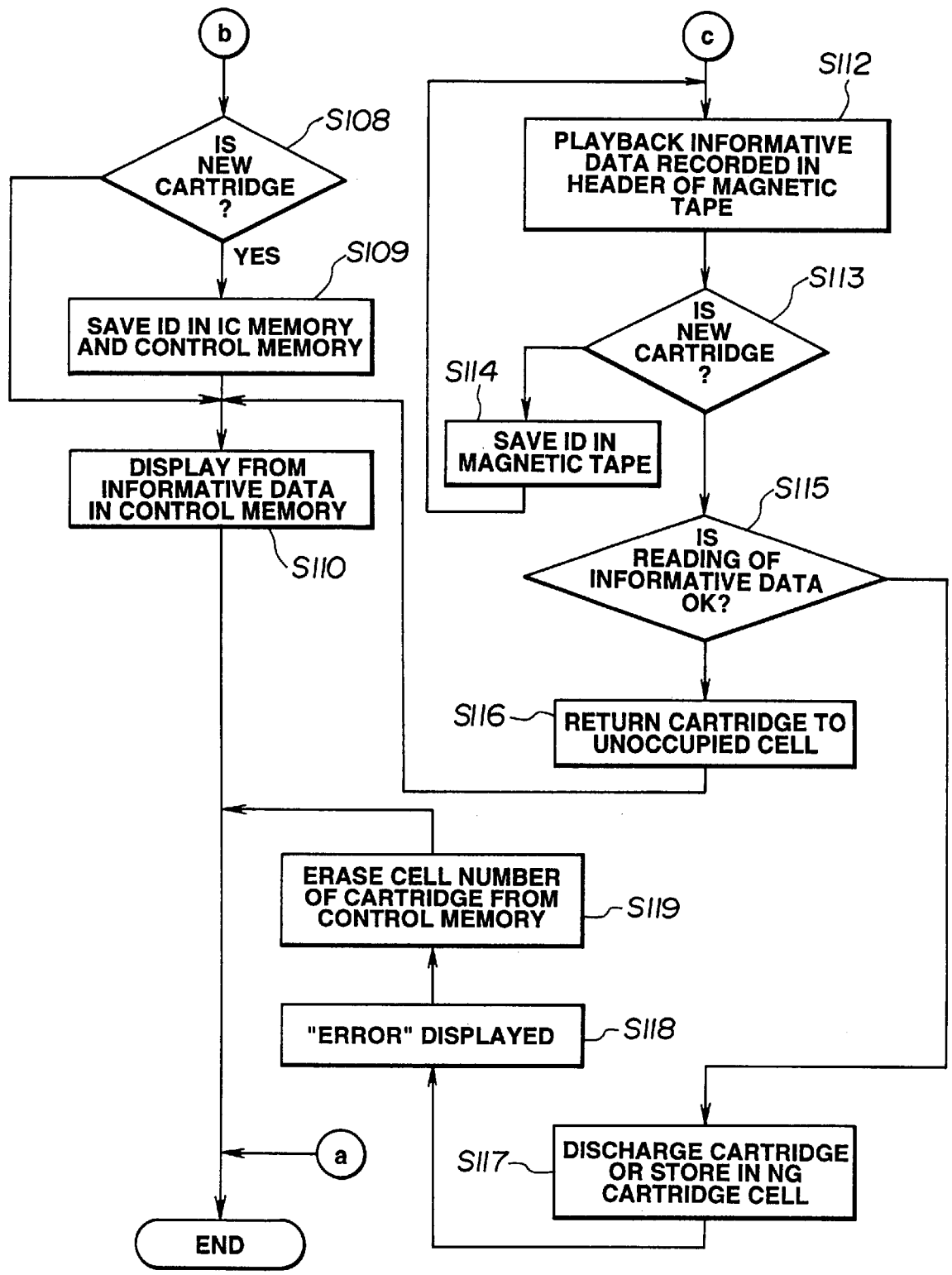

Step S107 allows the system controller 1 to read an informative data from the checked IC memory 51 and save it in the control memory 2, and is followed by Step S108 shown in FIG. 4B.

At Step S108, the system controller 1 reads the informative data saved in the control memory 2 to examine whether or not the magnetic tape cartridge 50 is new as accompanied with no ID. When the magnetic tape cartridge 50 is new, Step S109 follows. If not, i.e. the magnetic tape cartridge 50 is introduced from another autochanger or has once been removed from the cartridge storage 10 and is now wanted for re-storage, the procedure jumps to Step S110.

Step S109 allows the system controller 1 to assign a proper ID to the magnetic tape cartridge 50 and save the ID in both the IC memory 51 and the control memory 2, and is followed by Step S110.

The system controller 1 displays at Step S110 a profile on the display 6 from the informative data in the control memory 2 and the procedure is terminated.

Returning to Step S104, the system controller 1 displays a message, "no cell", on the display 6 informing the user that there is no unoccupied storage cell available before the procedure is terminated. The user is now acknowledged that none of the storage cells 11 is unoccupied and if desired, removes an unwanted magnetic tape cartridge 50 from the autochanger with the remote controller 7 to have one unoccupied cell 11. At Step S111, a part of the magnetic tape cartridge 50 is substituted for the IC memory 51 as it has been judged that the IC memory 51 is malfunctioned or not present.

Step S111 allows the system controller 1 to activate the carrier 4 for loading the magnetic tape cartridge 50 to the drive 21 and is followed by Step S112 shown in FIG. 4B.

At Step S112, the system controller 1 causes the drive 21 to read an informative data from a header of the magnetic tape 52 of the magnetic tape cartridge 50 and transmit it to the system controller 1.

It is examined by the system controller 1 referring to the informative data at Step S113 whether or not the magnetic tape cartridge 50 is a new cartridge having no ID number. When it is judged yes, the procedure goes to Step S114 and if not, to Step S115.

Step S114 allows the system controller 1 to activate the drive 21 for writing an appropriate ID to the header of the magnetic tape 52 and is followed by Step S115.

At Step S115, the system controller 1 instructs the drive 21 to play back the informative data of the magnetic tape 52 and then examines whether or not the informative data is correctly retrieved. When the informative data is correctly read, the procedure moves to Step S116 and if not) to Step S117.

Step S116 allows the system controller 1 to activate the carrier 4 for storing the magnetic tape cartridge 50 in the unoccupied storage cell 11 and is followed by Step S110 as described.

At Step S117, the system controller 1 causes the carrier 4 to convey the unlabeled magnetic tape cartridge 50 to the input/output port 5 for discharge from the autochanger. Instead, the system controller 1 may convey and store the unlabeled magnetic tape cartridge 50 to one of the cells 11 designated for storage of not good (NG) magnetic tape cartridges in the cartridge storage 10. The procedure then advances to Step S118.

Step S118 allows the system controller 1 to display an "error" message on the display 6 informing the user that the current magnetic tape cartridge 50 handled for storage in the cartridge storage 10 is an NG cartridge and is followed by Step S119.

At Step S119, the system controller 1 deletes the cell number of the NG magnetic tape cartridge 50 from the control memory 2 and the procedure is terminated. In other words, the NG magnetic tape cartridge 50 is labeled with 00 or accompanied with the cell number of the NG storage cell for storage of NG magnetic tape cartridge.

In this manner, the autochanger of the embodiment performs storage of a new magnetic tape cartridge 50 in a desired location of the cartridge storage 10 and if the new magnetic tape cartridge 50 is defective, may convey it for discharge. Also, the autochanger can handle the magnetic tape cartridges 50 accompanied with no IC memories 51.

The procedure of unloading a desired magnetic tape cartridge 50 from its storage cell 11 of the cartridge storage 10 and recording or playing back an informative data on the magnetic tape 52, while discharging a magnetic tape cartridge 50 of which the magnetic tape 52 is degraded from the autochanger will be described referring to the flow charts of FIGS. 5A, 5B, and 5C. Like alphabetic letters (a and b) represent linkage between the FIGS. 5A, 5B, and 5C.

Figure 5A:
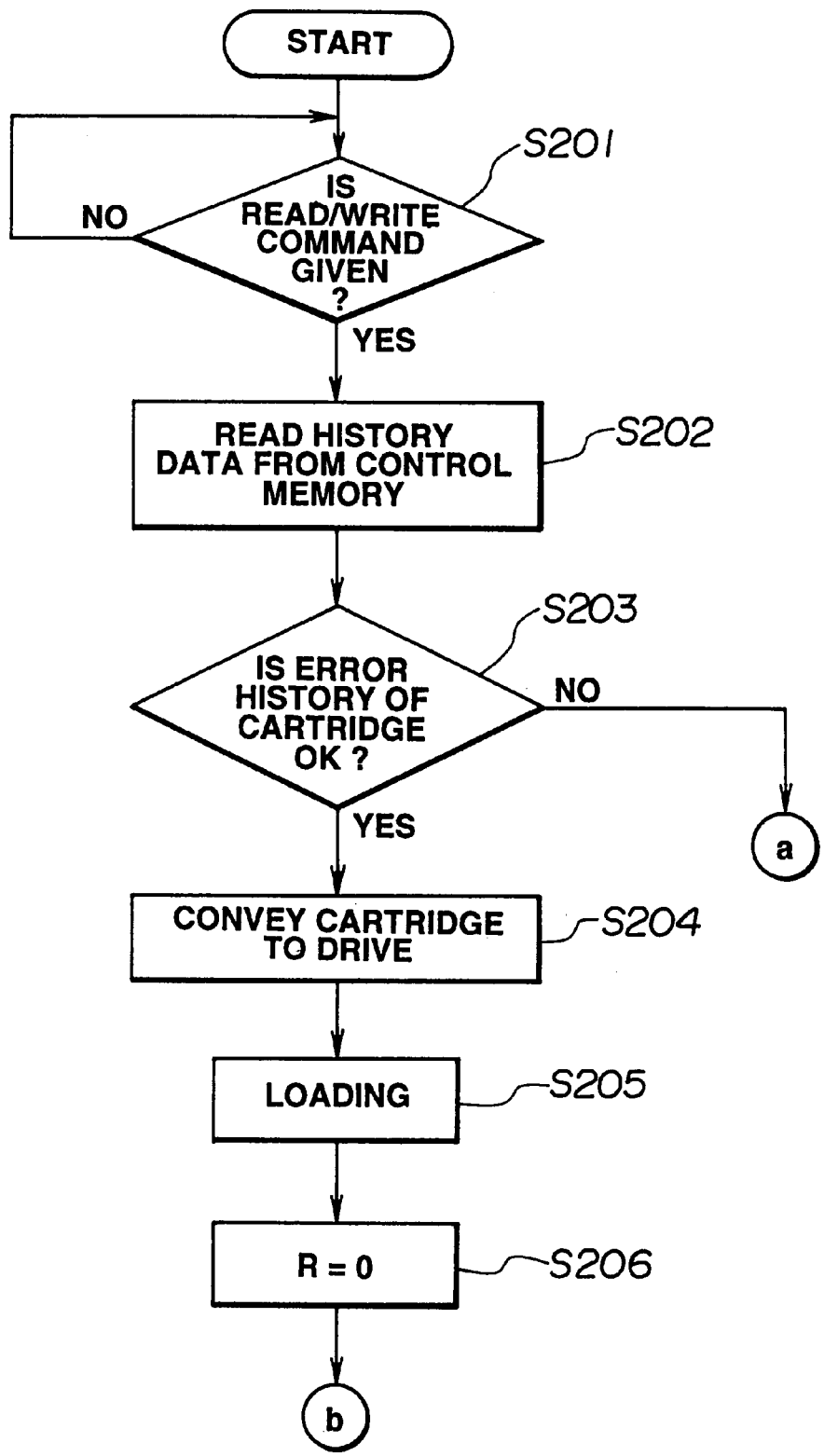
FIGS. 5A, 5b, and 5C are flow charts explaining steps of operation of the autochanger.
Figure 5B:
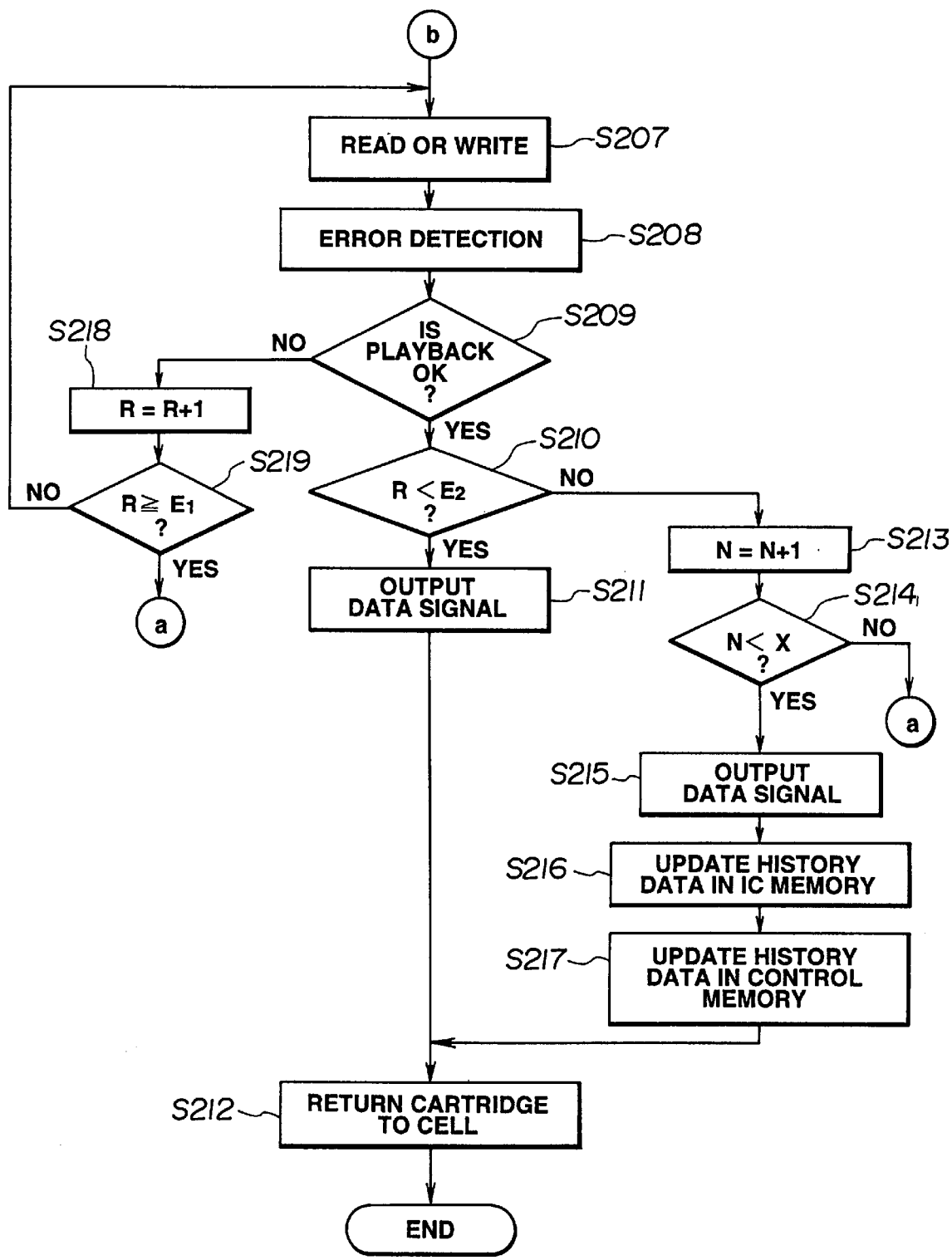
Figure 5C:
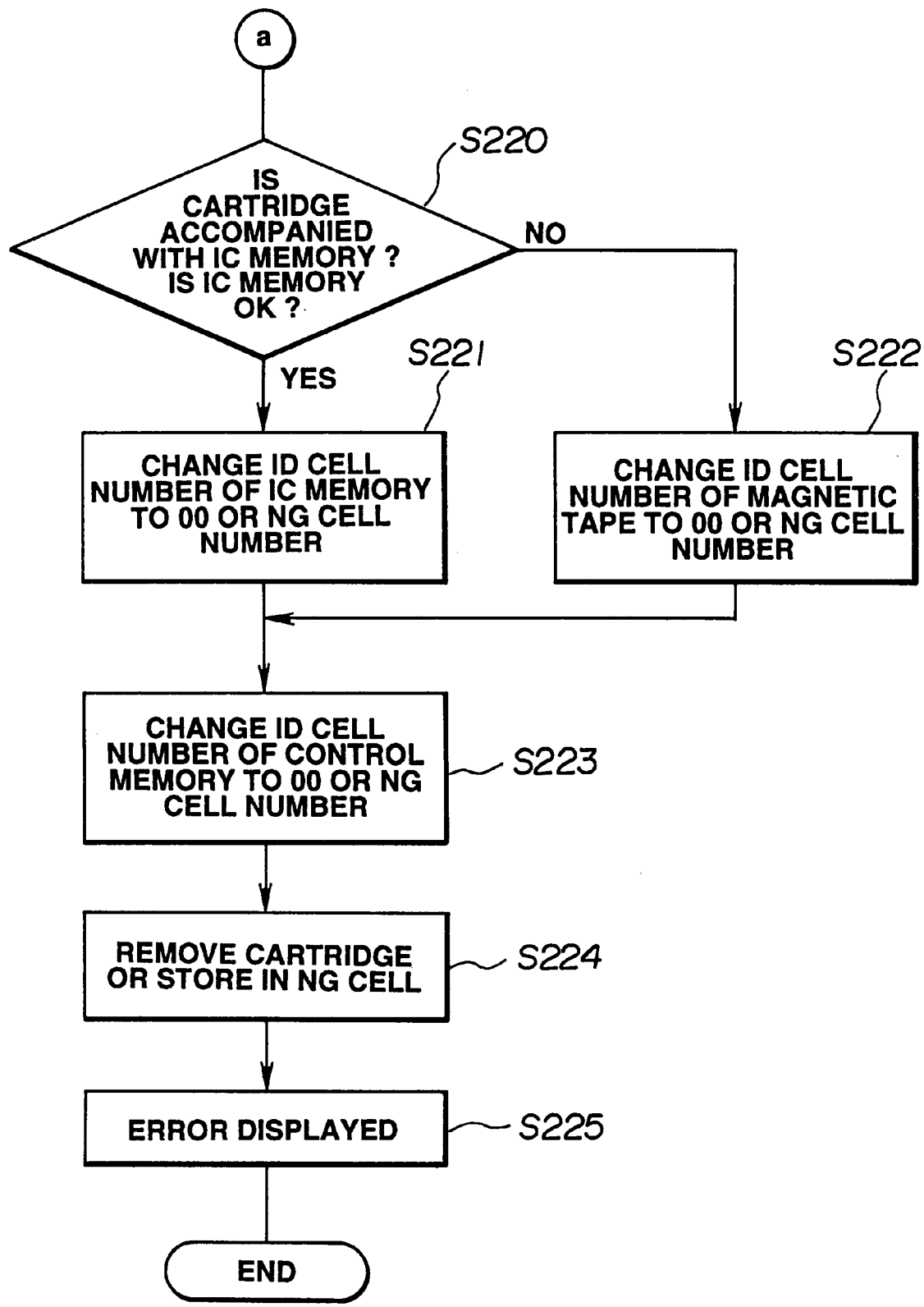

Referring to FIG. 5A, the procedure starts with Step S201 where the system controller 1 judges from the signal from the sensor 8 whether or not the user has demanded a cartridge with the remote controller 7 for either recording or playback. When the user has a cartridge the procedure goes to Step S202 and if not, Step S201 is repeated.

Step S202 allows the system controller 1 to retrieve an informative data, including a history of service, of the desired magnetic tape cartridge 50 from the control memory 2 and is followed by Step S203.

At Step S203, the system controller 1 surveys the history of service, including a variable N, of the magnetic tape cartridge 50 from control memory 2 to examine whether or not the variable N is smaller than a given value X representing the limit level of degradation on the magnetic tape 52 and whether the cell number is 00 i.e. designated as storing an ineligible or overly worn cartridge. When it is judged yes, the procedure moves to Step S204 and if not, to Step S220 shown in FIG. 5C. More specifically, when the variable N is smaller than the given value X of e.g. 10, with the cell number being not 00, S204 follows. Also, when the cell number is 00 or for NG cells, the procedure goes to Step S204. Otherwise, the procedure advances to Step S220. The cell number 00 and NG cell numbers represent NG magnetic tape cartridges 50.

At Step S204, the system controller 1 drives the carrier 4 for conveying the magnetic tape cartridge 50 to the drive 21.

This is followed by Step S205 where the controller 41 of the drive 21 actuates the load/unload mechanism 42 for loading the magnetic tape 52.

Step S206 then allows the system controller 1 to shift the retry number R to 0 and is followed by S207.

At Step S207, when retrieval of the informative data saved on the magnetic tape 52 of the magnetic tape cartridge 50 is requested, the system controller 1 produces and transmits its command signal to the controller 41 of the drive 21. If recording of the informative data on the magnetic tape 52 is wanted, the system controller I carries out the recording action and delivers a playback command signal to the controller 41 for playing back the informative data to be recorded.

Step S207 for reading the informative data from or writing and then reading the same on the magnetic tape 52 through the action of the controller 41 of the drive 21 is followed by Step S208 where the error detection/correction circuit 38 subjects a playback signal of the informative data to error correction and if errors are too many to be corrected, produces and transmits a corresponding information signal to the controller 41.

It is then determined by the controller 41 in response to the information signal at Step S209 whether the playback is correctly made or not. When the playback is correct, the procedure goes to Step S210 and if not to Step S218.

Step S218 allows the system controller 1 to add 1 to the retry number R and is followed by Step S219.

At Step S219, the system controller 1 determines whether or not the sum of 1 and the retry number R is not smaller than a given value E1. If not, the procedure goes back to Step S207 for executing a retry once again. If R equals EI, Step S220 for error processing follows as shown in FIG. 5C.

Referring to Step S210, the system controller 1 examines whether the retry number R is smaller than a value E2 which is exceeded by E1. When R is smaller, the procedure goes to Step S211 and if not, to Step S213. More particularly, if it is judged at Step S219 that the retry number R exceeds E1, the retry will not be repeated and the procedure moves to Step S220 of FIG. 5C. If R is below E1, the retry is repeated.

Step S211 goes in which the retrieved data signal is transmitted to the computer by control action of the controller 41 of the drive 21.

At Step S212, the system controller 1 reviews the ID and cell number from the control memory 2 and returns the magnetic tape cartridge 50, data of which magnetic tape 52 is played back or recorded, to its original storage cell 11 and the procedure is terminated.

Returning to Step S213, the system controller 1 adds one to the variable N and the procedure moves to S214.

It is determined by the system controller 1 at Step S214 whether or not the sum of 1 and the variable N is smaller than X. When the sum is smaller, the procedure goes to Step S215 and if not, to Step S220 of FIG. 5C. The significance of this sequence of the steps will be explained. If the retry number R at the first access exceeds E1, it is judged that the magnetic tape cartridge 50 is an NG cartridge. Also, when R is smaller than E1 but the number of access actions or the variable N exceeds X without R<E2, it is determined that the magnetic tape cartridge 50 is an NG cartridge. This will increase the effectiveness of identifying the NG magnetic tape cartridges 50.

At Step S215, the controller 41 of the drive 21 allows transmission of the retrieved data signal to the computer.

Step S216 follows in which the controller 41 of the drive 21 updates the history of service or the variable N in the IC memory 51 to a new value.

At Step S217, the history of service or the variable N in the control memory 2 is updated by the system controller 1 and the procedure advances to Step S212.

Returning to Step S220, the system controller 1 reads the IC memory yes/no and OK/NG options of the informative data from the control memory 2 and determines whether or not the magnetic tape cartridge 50 is accompanied with the IC memory 51 and if yes, whether or not the IC memory 51 is correctly actuated. When it is judged yes (i.e. the IC memory yes/no option is 1 and the OK/NG option is 1), the procedure goes to Step S221 and if not, to Step S222.

Step S221 allows the controller 41 of the drive 21 to change the cell number attributed to ID of the IC memory 51 to 00 or to update the same to the number of an NG storage cell 11 available for storage of an NG cartridge and is followed by Step S223.

At Step S222, the system controller 1 changes the cell number attributed to the ID saved on the magnetic tape 52 thereof to 00 or updates the same to the number of an NG storage cell 11 for storage of an NG cartridge, and Step S223 follows.

At Step S223, the system controller 1 changes the cell number attributed to the ID saved in the control memory 2 to 00 or updates the same to the number of an NG storage cell 11 for storage of an NG cartridge, and the procedure goes to Step S224.

Step S224 allows the system controller 1 to activate the carrier 4 for conveying the NG magnetic tape cartridge 50 to the input/output port 5 for discharge from the autochanger. The system controller 1 may drive the carrier 4 to convey and store the NG magnetic tape cartridge 50 in an NG storage cell 11 for storage of an NG cartridge in the cartridge storage 10. The procedure then goes to Step S225.

At Step S225, the system controller 1 displays an "error" message on the display 6 informing the user that the magnetic tape cartridge 50 handled is considerably degraded, before the procedure is terminated.

What is claimed is:

1. An autochanger comprising:
   a storage unit including a plurality of storage sections for storing recording medium cartridges, each cartridge having a recording medium installed therein and a first memory for storing informative data of the recording medium;
   a first accessing means for accessing the first memory of said cartridge;
   a second accessing means for loading and unloading said cartridges and accessing a data signal on the recording mediums of said cartridges;
   a conveying means for conveying said cartridges between the storage unit and the second accessing means;
   a second memory for saving the informative data; and
   a controlling means for controlling storage of said cartridges in said storage unit by reading through the first accessing means the informative data from the first memories on said cartridges, saving the informative data in the second memory, and updating the informative data in both the first and second memories according to a response of the second accessing means to accessing data on the recording medium of the cartridges.

2. An autochanger as set forth in claim 1, wherein both the first and second memories save as the informative data a history of access actions of the second accessing means to the data on the recording medium of each cartridge, and the controlling means is responsive to the history of access action for controlling the actions of the second accessing means and conveying means.

3. An autochanger as set forth in claim 1, wherein the second accessing means includes a third accessing means for accessing the informative data in the first memory of the cartridge type recording medium which is loaded in the second accessing means.

4. An autochanger as set forth in claim 1, wherein the second accessing means includes an access error detecting means for detecting an access error during accessing the data on the recording medium of a cartridge which is loaded in the second accessing means.

5. An autochanger as set forth in claim 4, wherein the controlling means is responsive to the accessing error detected by the access error detecting means for updating the informative data saved in both the first and second memories.

6. An autochanger as set forth in claim 4, wherein the access error detecting means determines from the result of detection of the access error detecting means whether or not the cartridge is eligible for use and when it is determined not eligible, directs the conveying means to remove the cartridge from the autochanger and simultaneously, and erases at least a corresponding part of the informative data of the removed cartridge type recording medium saved in the second memory.

7. An autochanger as set forth in claim 6, wherein the second memory saves, as a part of the informative data, an identity data attributed to each storage section, and the controlling means erases the identity data for a particular cartridge when the particular cartridge is determined from the result of detection of the access error detecting means to be ineligible for use.

8. An autochanger as set forth in claim 4, wherein the controlling means determines from the result of detection of the access error detecting means whether or not the cartridge is eligible for use and when a cartridge is determined not eligible, the controlling means directs the conveying means to convey and store the cartridge in a storage section of the storing means prepared for storage of an unusable cartridge.

* * * * *